United States Patent
Bells et al.

(10) Patent No.: US 7,995,079 B2
(45) Date of Patent: Aug. 9, 2011

(54) AUTOMATIC MAP ZOOM-LEVEL ADAPTATION

(75) Inventors: Matthew Bells, Waterloo (CA);
Gerhard Klassen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 579 days.

(21) Appl. No.: 11/735,524

(22) Filed: Apr. 16, 2007

(65) Prior Publication Data
US 2008/0253757 A1 Oct. 16, 2008

(51) Int. Cl.
*G09G 5/00* (2006.01)
(52) U.S. Cl. .................................. 345/660; 701/200
(58) Field of Classification Search .................. None
See application file for complete search history.

(56) References Cited

U.S. PATENT DOCUMENTS

| | | | |
|---|---|---|---|
| 5,084,822 A | 1/1992 | Hayami | |
| 6,144,920 A | 11/2000 | Mikame | |
| 6,553,308 B1 | 4/2003 | Uhlmann et al. | |
| 2004/0243307 A1 | 12/2004 | Geelen | |
| 2006/0074553 A1* | 4/2006 | Foo et al. | 701/212 |
| 2006/0136125 A1* | 6/2006 | Chua | 701/208 |
| 2007/0150189 A1* | 6/2007 | Han | 701/212 |

FOREIGN PATENT DOCUMENTS

| | | |
|---|---|---|
| DE | 195 37 255 | 4/1996 |
| DE | 100 27 516 | 12/2001 |
| EP | 1 643 214 | 4/2006 |
| JP | 59 212707 | 12/1984 |
| JP | 08 137391 | 5/1996 |

OTHER PUBLICATIONS

WO 2004/088248—Oct. 14, 2004—Chua Beng San; Wong Lai Wan.
Search Report issued by the European Patent Office dated May 10, 2007 for corresponding European Patent Application No. 07106218.6.

* cited by examiner

*Primary Examiner* — Andrew Wang
*Assistant Examiner* — David H Chu
(74) *Attorney, Agent, or Firm* — Gowling Lafleur Henderson LLP

(57) ABSTRACT

A method is provided for dynamically determining a zoom-level to display to a user of a mapping application executing on a mobile device. The method comprises the following steps. The zoom-level is determined in accordance with at least one predefined parameter. The at least one predefined parameter is monitored for detecting a change. A new zoom-level corresponding with the detected change is determined. Lastly, the zoom-level of the mapping application is changed to the new zoom-level. A mobile device and computer-readable medium configured to implement the method are also provided.

15 Claims, 3 Drawing Sheets

US 7,995,079 B2

AUTOMATIC MAP ZOOM-LEVEL ADAPTATION

The present disclosure relates generally to mapping applications and specifically to a method and device for automatically adapting a zoom level of a map displayed by the mapping application.

BACKGROUND

With the recent advancements of Global Positioning System (GPS) devices, integration between compact GPS receivers and mobile devices, such as cell phones and portable digital assistants (PDAs), is becoming popular. This merger of technology provides many different possibilities for users of the mobile devices, as their devices can perform tasks that were not previously possible. However, in many cases a user interface to GPS functionality in the mobile devices is not as robust as it could be and, in some cases, provides a bad user experience.

One problem in particular relates to the display of maps on the mobile device. Mapping applications executing on the mobile device can display a map illustrating a user's surrounding region, as determined by the GPS or other location determining mechanism. When the map is displayed to the user, the user, a location-based server, or the mapping application determines an appropriate zoom-level at which it is to be displayed.

The selected zoom-level can make a difference regarding the utility of the information. Accordingly, once the zoom-level has been set it can be manually adjusted by the user. However, it can be cumbersome and inconvenient for the user to adjust the zoom level appropriately.

Currently, systems such as Pharos' EZ Road Pocket GPS Navigator provide the ability to increase the zoom-level, or zoom in, on a map for a turn in a pre-programmed route. However, such solutions only described zooming in on a region of the map when a user has entered a pre-programmed route. That is, the zoom-level instructions are received as part of the routing data.

Therefore, it can be seen that there is a need for a mapping application that can automatically adapt the zoom-level of a map regardless of whether or not the user is following a predetermined route.

BRIEF DESCRIPTION OF THE DRAWINGS

Embodiments of the description will now be described by way of example only with reference to the following drawings in which.

DETAILED DESCRIPTION OF THE PREFERRED EMBODIMENTS

In accordance with an embodiment there is provided a method for dynamically determining a zoom-level to display to a user of a mapping application executing on a mobile device, the method comprising the steps of: determining the zoom-level in accordance with at least one predefined parameter; monitoring the at least one predefined parameter for detecting a change; determining a new zoom-level that corresponds with the detected change in the at least one predefined parameter; and changing the zoom-level of the mapping application to the new zoom-level.

In accordance with another embodiment there is provided a mobile device configured to provide a user with a mapping application, the mobile device comprising: a memory including instructions for: determining the zoom-level in accordance with at least one predefined parameter; monitoring the at least one predefined parameter for detecting a change; determining a new zoom-level that corresponds with the detected change in the at least one predefined parameter; changing the zoom-level of the mapping application to the new zoom-level; and a processor configured to execute the instructions on the device for dynamically determining a zoom-level to display to a user of the mapping application.

In accordance with yet another embodiment there is provided a computer readable medium comprising instructions which, when executed on a mobile device, cause the mobile device to dynamically determine a zoom-level to display to a user of a mapping application executing on the mobile device, the instructions causing the mobile device to implement the steps of: determining the zoom-level in accordance with at least one predefined parameter; monitoring the at least one predefined parameter for detecting a change; determining a new zoom-level that corresponds with the detected change in the at least one predefined parameter; and changing the zoom-level of the mapping application to the new zoom-level.

Figure 1:
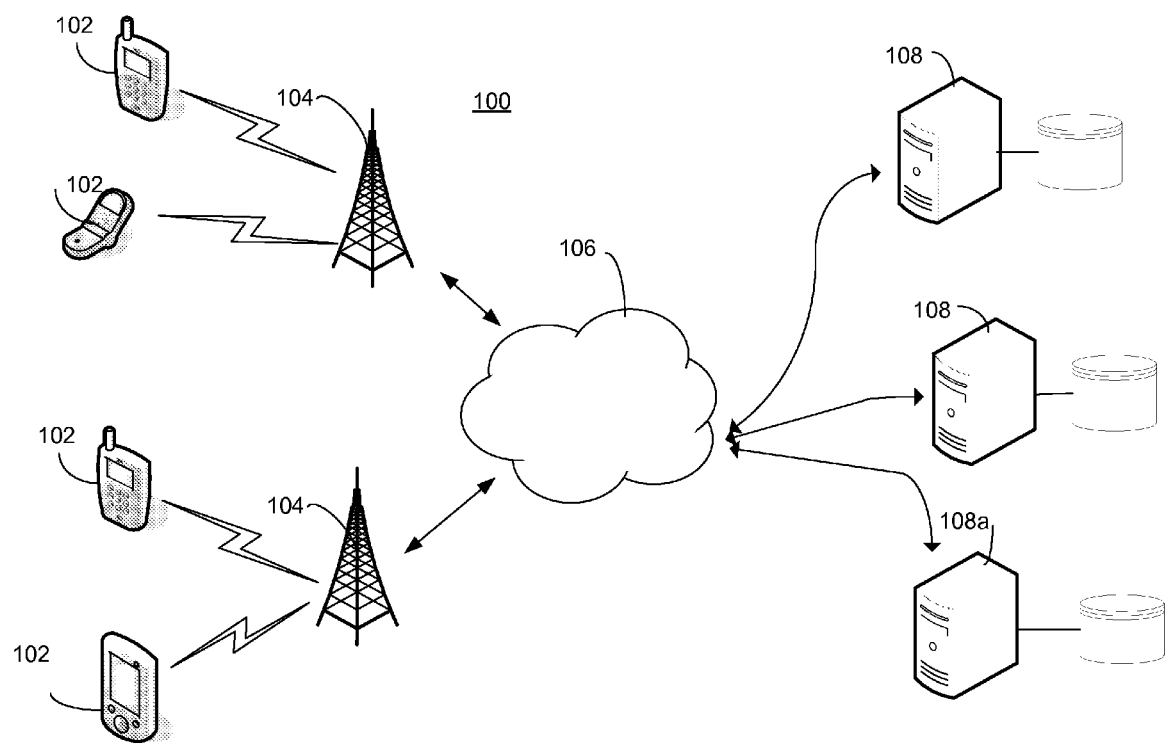
FIG. 1 is a block diagram illustrating a telecommunication infrastructure (prior art)

For convenience, like numerals in the description refer to like structures in the drawings. Referring to FIG. 1, a typical telecommunication infrastructure is illustrated generally by numeral 100. The telecommunication infrastructure 100 includes a plurality of mobile devices 102, a plurality of base stations 104, a communication network 106 and a plurality of network servers 108.

The mobile devices 102 include wireless computing devices such as a smart phone, a personal digital assistant (PDA), a GPS enabled trip computer in a vehicle and the like. The mobile devices 102 are in communication with one of the base stations 104. The base stations 104 relay data between the mobile devices 102 and the network servers 108 via the communication network 106. Accordingly, the communication network 106 may include several components such as a wireless network, a relay, a corporate server and/or a mobile data server for relaying data between the base stations 104 and the network servers 108.

The network servers 108 include servers such as a Web server, an application server, and an application server with web services. An example of an application server 108 is a location based server 108a. Location based servers 108a use position information relating to a user's location with intelligent applications and solutions to provide relevant information and services to the user. For example, a mapping application executing on the mobile device 102 may retrieve relevant mapping data for presenting to the user. The location based server 108a uses the position of the mobile device 102 to assist in determining the appropriate mapping data to transmit.

It will be appreciated by a person of ordinary skill in the art that the telecommunication infrastructure 100 described herein is exemplary and that changes may be made to one or more components to accommodate different network configurations without affecting the scope of the invention described and claimed herein.

Figure 2:
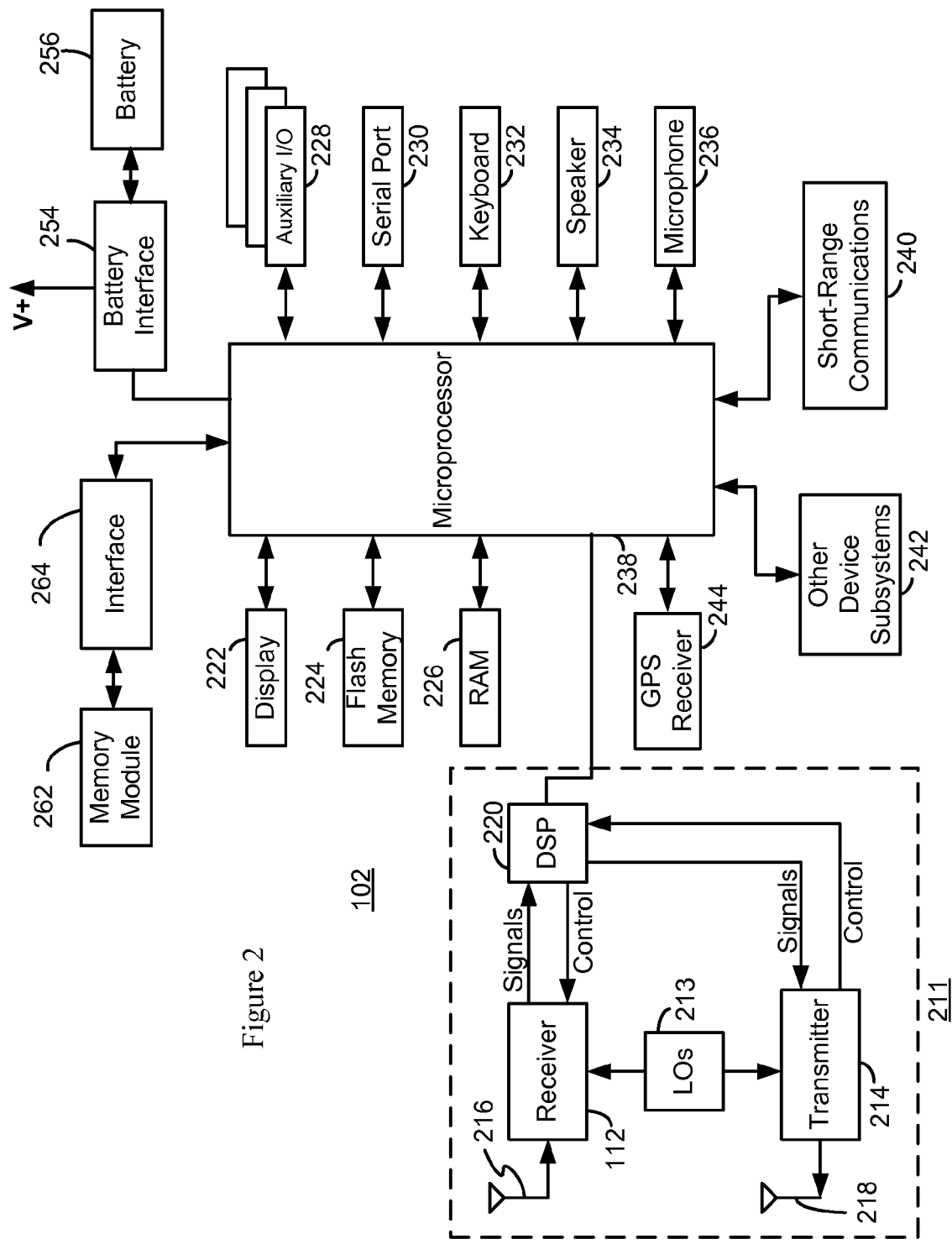
FIG. 2 is a block diagram illustrating components of a mobile device.

Referring to FIG. 2, a mobile device 102 is illustrated in greater detail. The mobile device 102 is often a two-way communication device having both voice and data communication capabilities, including the capability to communicate with other computer systems. Depending on the functionality provided by the mobile device 102, it may be referred to as a data messaging device, a two-way pager, a cellular telephone with data messaging capabilities, a wireless Internet appliance, or a data communication device.

The mobile device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which mobile device 102 is intended to operate.

The mobile device 102 includes a microprocessor 238 which controls general operation of the mobile device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as Bluetooth™ for example, and any other device subsystems or peripheral devices generally designated at 242. The mobile device 102 also includes a positioning device 244 for receiving positioning information.

The positioning device 244 may be a global navigation satellite system receiver, such as a GPS or a Galileo receiver for example, for receiving satellite broadcasts. In one embodiment, the satellite broadcast data is used by the mobile device 102 to determine its position. In another embodiment, the satellite broadcast data is transmitted from the mobile device 102 to one of the network servers 108 to determine the position of the mobile device 102. One such technique is known as assisted-GPS. In assisted-GPS, signalling information from a position determining entity is provided to the mobile device 102 to aid in position determination. As long as the mobile device 102 can connect with the network server 108, it can query its location from the network server 108.

Alternatively, the positioning device 244 may comprise a positioning module for receiving positioning information from one of the network servers 108. In this embodiment, the positioning module may comprise a software, rather than a hardware, solution.

Operating system software used by the microprocessor 238 is preferably stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, preferably enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through the network 106, an auxiliary I/O subsystem 228, serial port 230, short-range communications subsystem 240, or any other suitable subsystem 242, and installed by a user in RAM 226, or preferably the persistent store 224, for execution by the microprocessor 238. Such flexibility in application installation increases the functionality of the mobile device 102 and may provide enhanced on-device features, communication-related features, or both.

The display 222 is used to visually present an application's graphical user interface (GUI) to the user. The user can manipulate application data by modifying information on the GUI using an input device such as the keyboard 232 for example. Depending on the type of mobile device 102, the user may have access to other types of input devices, such as, for example, a scroll wheel, trackball, light pen or touch sensitive screen.

Location-based applications executing on the mobile device 102 use positioning information from the positioning device 244 to provide relevant information to the user, often in real-time. As described above, the positioning device 244 may be a global navigation satellite system receiver for receiving satellite broadcasts. In one embodiment, the satellite broadcast data is used by the mobile device 102 to determine its position. In another embodiment, the satellite broadcast data is transmitted from the mobile device to one of the network servers 108 to determine the position of the mobile device.

Alternatively, the positioning device 244 may be a positioning module for receiving positioning information from one of the network servers 108. In this embodiment, the positioning module may comprise a software, rather than a hardware, solution.

Accordingly, automatic zoom-level adjustment software can be provisioned on the mobile device 102. The automatic zoom-level adjustment software can be implemented as a standalone, or plug-in, application that interfaces with a pre-existing mapping application or it can be incorporated into a new mapping application, as will be appreciated by a person of ordinary skill in the art.

The automatic zoom-level adjustment software can be configured to implement one or more methods to manage the zoom-level of a map being shown on the display 222, as described below. Further, different parameters relating to the implemented methods can be set and/or adjusted by either a system administrator or the user. The automatic zoom-level adjustment software is configured to automatically adjust the zoom-level of a map in an attempt to predict the needs of the user. Depending on the implementation, the user may be able to disable the automatic zoom-level adjustment software or override its decisions.

Figure 3:
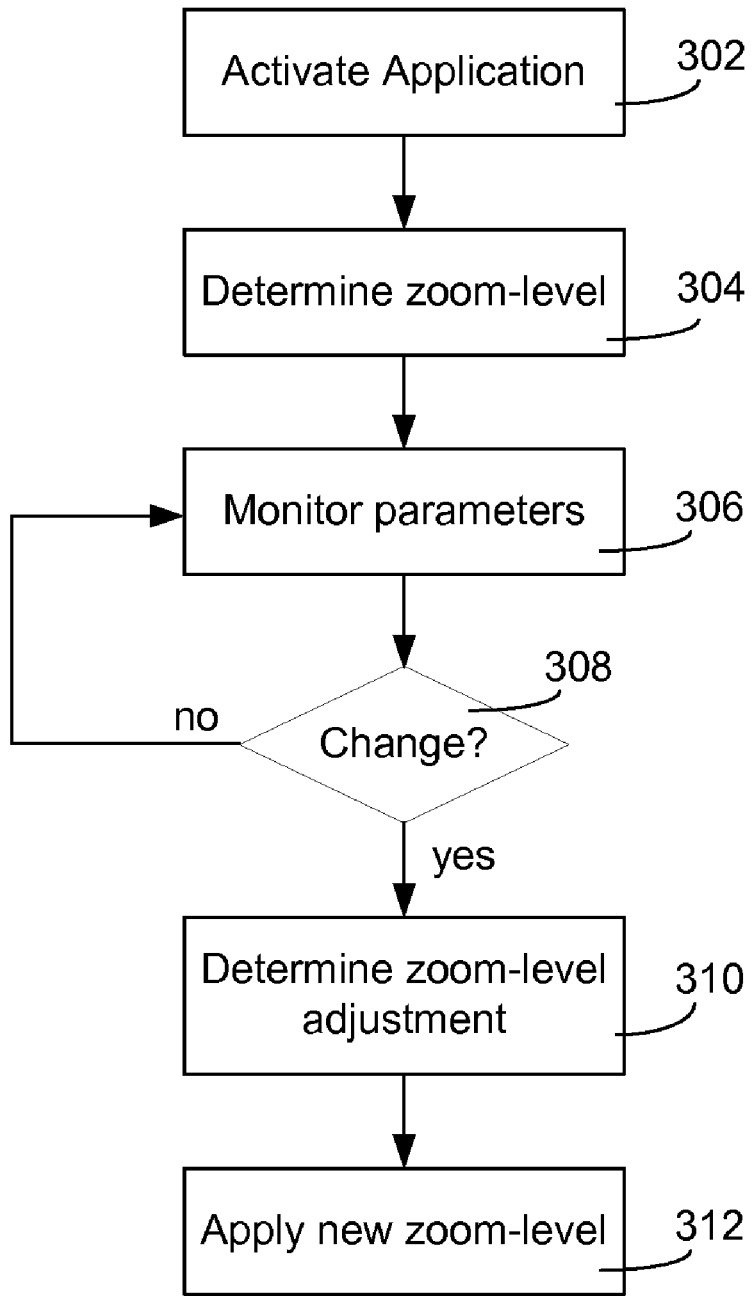
FIG. 3 is a flow chart illustrating a method of automatic map zoom-level adaptation.

Referring to FIG. 3, a flow chart illustrating a method for automatically adjusting the zoom-level of a map is shown generally by numeral 300. At step 302, the user activates a mapping application on the mobile device 102. At step 304, an appropriate zoom-level at which to display the map is determined, based on at least one of a plurality of predefined parameters.

At step 306, the parameters are monitored in order to detect a change. If a change is detected at step 308 in one of the parameters, the method continues at step 310.

At step 310, the detected parameter change is analysed to determine its affect on the zoom-level. For example, it is determined whether the zoom-level should be increased or decreased. Additionally, it is determined how many zoom levels should be increased or decreased to satisfy the parameter change.

At step 312, once the appropriate zoom-level has been determined, the map presented on the display 222 of the wireless device 102 is adjusted accordingly. The method returns to step 304 and continues to monitor for a change in at least one of the predefined parameters.

Accordingly, it will be appreciated by a person of ordinary skill in the art that the automatic zoom-level adjustment software allows the zoom-level of a map displayed by the mapping application to be adjusted dynamically, without regard to a pre-programmed route or directions.

The parameters discussed with reference to FIG. 3 may include static information, such as city boundaries and points of interest, as well as dynamic information, such as speed, location and feature density.

In one embodiment, city boundary information is used to determine the zoom-level since city driving often requires a greater level of detail, or increased zoom-level, than rural driving due the increased street density in the city. Therefore, predefined boundaries for cities are established. If it is determined that the mobile device 102 is located within a city's boundary, the zoom-level is set accordingly. If it is determined that the mobile device 102 is located outside a city, the zoom-level is set accordingly. If it is determined that the mobile device 102 moves from within a city boundary to outside the city boundary, or vice versa, the zoom-level is adjusted accordingly.

Therefore, at step 304 the automatic zoom-level adjustment software determines whether the mobile device 102 is in a city or a rural area and sets the zoom-level accordingly. At step 308, a change in zoom-level is required when the mobile device 102 passes a predefined city boundary. At step 310, the zoom-level is adjusted by decreasing the detail level for a change from city to rural and vice versa.

Further, different zoom-levels may be defined for different city boundaries. For example, some small towns may not require as high a detail level as a larger cities, or even other small towns.

Yet further, different zoom-levels may be defined for subsets within a city boundary. For example, the city may divided into further sub-areas. Some of these sub-areas may not require as high a detail level other sub-areas. Similarly, rural areas outside of the city boundaries may be divided into sub-areas. Therefore, the automatic zoom-level adjustment software can make decisions based on the location of the mobile device 102 with respect to these boundaries.

In the embodiment above, the boundaries are predefined and the automatic zoom-level adjustment software determines the zoom-level in accordance with the location of the mobile device 102 in the context of these boundaries.

In another embodiment, the automatic zoom-level adjustment software dynamically determines a feature density of the region in which the mobile device 102 is located in order to determine the zoom-level. In one example, the feature density is road density. Accordingly, a series of thresholds are defined to correlate the road density with an appropriate zoom-level. Specifically each zoom-level is associated with a corresponding range of road density values between an upper and a lower threshold Therefore, at step 304 the automatic zoom-level adjustment software determines the road density and selects the corresponding zoom-level. At step 308, a change in zoom-level is required when the road density crosses one of the upper or lower thresholds. At step 310, the zoom-level is changed in accordance with the corresponding road density value range. For example, if the road density crosses the upper threshold, the detail level is increased. If the road density crosses the lower threshold, the detail level is decreased.

Other examples of feature density include: number intersections with the road on which the user is determined to be travelling (in this example overpasses may be weighted less than intersections or roundabouts); road curvature for allowing inspection of upcoming turns; different road types; water (such as lakes, rivers and the like); building density; and points of interest such as retail shops, parks, restaurants, or transit stops. It may further be possible to detect the user entering a building such as a shopping mall and setting the appropriate zoom-level accordingly. In this example, the detail level may include the location of shops within the shopping mall.

In yet another embodiment, the automatic zoom-level adjustment software dynamically calculates the speed of the mobile device 102 in order to determine the zoom-level. It is well known in the art to use a location device, such as a global navigation satellite system receiver, to calculate the speed that the device is travelling. Accordingly, the automatic zoom-level adjustment software is configured to perform the necessary speed calculations.

Speed is often a good indicator of a desired zoom-level. Thus, for example, since high speeds are often associated with expressways and rural highways, the zoom-level can be adjusted to a lower detail level to include major routes and features. In contrast, slower speeds are often associated with city driving and the zoom level can be adjusted to a higher detail level to include intersections, side streets, house numbers.

In one extreme example, if travelling at airplane speed, the zoom-level could be adjusted to a lower detail level to include large cities and landmarks. In another extreme example, if travelling at a walking speed, the zoom-level could also be adjusted to a higher level detail to include walking paths, street numbers and/or shops, if available.

Similar to the road density example, a series of thresholds are defined to correlate the speed of the mobile device with an appropriate zoom-level. Each zoom-level is associated with a corresponding range of speed values between an upper and a lower threshold Therefore, at step 304 the automatic zoom-level adjustment software determines the speed and selects the corresponding zoom-level. At step 308, a change in zoom-level is required when the speed crosses one of the upper or lower thresholds. At step 310, the zoom-level is changed in accordance with the corresponding speed value range. For example, if the speed crosses the upper threshold, the detail level is decreased. If the speed crosses the lower threshold, the detail level is increased.

Although the present embodiment describes the automatic zoom-level adjustment software as determining the speed, other methods for the determining the speed will be apparent to a person of ordinary skill in art. For example, a dedicated speed module can be provided on the mobile device 102, that determines the speed and feeds the speed information to the automatic zoom-level adjustment software. Alternatively, the speed module could be located external to the mobile device 102. Accordingly, it will be appreciated that how the speed is determined is of little significance to the operation of the automatic zoom-level adjustment software.

In yet another embodiment, the automatic zoom-level adjustment software dynamically determines the location of the mobile device 102 in order to determine the zoom-level. For example, a lower detail zoom-level may be used if it is determined that the mobile device 102 is on a highway. A higher detail zoom-level may be used if it is determined that the mobile device is on a side road or in a parking lot. Further, an even higher detail zoom-level may be used if the mobile device 102 is determined to be in a park. Accordingly, locations can be arranged by class and each class is assigned an associated zoom-level.

Therefore, at step 304 the automatic zoom-level adjustment software determines the location of the mobile device 102 and the class of the location, and selects the corresponding zoom-level. At step 308, a change in zoom-level is required when the location of the mobile device 102 changes to a different location that is also in a different class. Thus, for example, changing from one highway to another would not necessarily change the zoom-level. However, exiting a highway to a local street might change the zoom-level.

At step 310, the zoom-level is changed in accordance with the corresponding class of the new location. Thus, if the change of location results in a new class, the detail level of the map is adjusted to match the zoom-level of the new class.

In yet another embodiment, the automatic zoom-level adjustment software dynamically determines the zoom-level in accordance with predefined points of interest in an area. In the present embodiment, the area includes a predefined region centred on the location of the mobile device 102. However, defining the area is a design choice and other ways to do so will be apparent to a person of ordinary skill in the art.

The points of interest may be defined, for example, by the user or by a third party providing the user with directions. Therefore, the zoom-level is automatically adjusted to ensure that the points of interest are visible to the user.

Examples of points of interest include landmarks that may be used for navigation if the user is following a route, local businesses that may be of interest to the user, locations the user has visited in the past, and contacts that may be in the area. Similar to the previous embodiment, landmarks can be assigned to a class, each class having an associated zoom-level.

Therefore, at step 304 the automatic zoom-level adjustment software determines the location of the mobile device 102 and whether or not there are any points of interest in the area. If there are points of interest in the area, the corresponding zoom-level is selected in accordance with its class. At step 308, a change in zoom-level may be required when there is change in class of the points of interest in the area or the points of interest disappear from the area.

At step 310, the zoom-level is changed in accordance with the corresponding class of the new point of interest. For example, if the new point of interest is of a different class, the detail level of the map is adjusted to match the zoom-level of the new class.

Further, although each of the embodiments describes implementing the automatic zoom-level adjustment software with a single parameter, it will be appreciated that various combinations of the different embodiments can also be implemented. In such a case, rules would be implemented to assist with conflicts. For example, different priority levels can be assigned to each of the parameters in case of a conflict. In another example, the rules can provide a conflict mediation and result in a zoom-level in-between those selected by the conflicting parameters.

For example, being caught in a traffic jam on an expressway is not necessarily a reason to change the zoom-level, even though it will result in a significant decrease in speed. Accordingly, feature conflict resolution rules could determine a maximum automatic zoom-level when it is determined that the mobile device 102 is on the expressway.

Additionally, external factors may also be used when considering conflict resolution. For example, as is known in the art the mobile device 102 may be paired with a "car kit" to provide the user with easy accessibility while in a vehicle. Accordingly, the act of pairing/unpairing the mobile device 102 from the car kit may be used as an additional factor for resolving potential conflicts.

These and other rules will become apparent to a person of ordinary skill in the art.

From the embodiments described above, it is apparent that the automatic zoom-level adjustment software will be able to provide the user with an improved experience while using a mapping application.

The invention claimed is:

1. A method of dynamically determining a zoom-level to display a mapping application executing on a mobile device, the method comprising:
    determining the zoom-level in accordance with a plurality of predefined parameters;
    monitoring the plurality of predefined parameters for detecting a change;
    determining respective new zoom-levels that corresponds with the detected change in the plurality of predefined parameters;
    resolving conflicts, based at least on an external factor comprising pairing/unpairing the mobile device with a car kit, between the plurality of predefined parameters corresponding with the respective zoom levels; and
    changing the zoom-level of the mapping application to a mediated zoom-level.

2. The method of claim 1, wherein the conflicts are resolved by assigning priority levels to each of the plurality of predefined parameters.

3. The method of claim 1, wherein the conflicts are resolved by compromising between the zoom-levels of each of the plurality of predefined parameters.

4. The method of claim 1, further comprising determining the position of the mobile device.

5. The method of claim 4, wherein one of the predefined parameters is an area boundary and the change is detected when the position of the mobile device crosses the area boundary.

6. The method of claim 4, wherein one of the predefined parameters is a location of the mobile device, the location having a predefined class, and the change is detected when the position of the mobile device results in a change of the location class.

7. The method of claim 4, wherein one of the predefined parameters is a point of interest within an area about the position of the mobile device, the point of interest having a predefined class, and the change is detected when a change in the point of interest within the area results in a change of the class.

8. The method of claim 1, wherein one of the predefined parameters is a parameter density and the change is detected when the parameter density increases above a predefined upper threshold or falls below a predefined lower threshold.

9. The method of claim 1 further comprising determining the speed of the mobile device.

10. The method of claim 9, wherein one of the predefined parameters is the speed of the mobile device and the change is detected when the speed increases above a predefined upper threshold or falls below a predefined lower threshold.

11. A mobile device configured to provide a mapping application, the mobile device comprising:
    a memory including instructions for:
    determining the zoom-level in accordance with a plurality of predefined parameters;
    monitoring the plurality of predefined parameters for detecting a change;
    determining respective new zoom-levels that correspond with the detected change in the plurality of predefined parameters;
    resolving conflicts, based at least on an external factor comprising pairing/ unpairing the mobile device with a car kit, between the plurality of predefined parameters corresponding with the respective zoom levels; and changing the zoom-level of the mapping application to a mediated zoom-level; and a processor configured to execute the instructions on the device for dynamically determining a mediated zoom-level for display of the mapping application.

12. The mobile device of claim 11 further comprising a positioning device for determining a position of the mobile device.

13. The mobile device of claim 12, wherein the positioning device is a global navigation satellite system receiver.

14. The mobile device of claim 12 further comprising a speed module configured to determine the speed of the mobile device.

15. A computer readable memory comprising instructions which, when executed on a mobile device, cause the mobile device to dynamically determine a mediated zoom-level for display within a mapping application executing on the mobile device, the instructions causing the mobile device to:

determine the zoom-level in accordance with a plurality of predefined parameters;

monitor the plurality of predefined parameters for detecting a change;

determine respective new zoom-levels that correspond with the detected change in the plurality of predefined parameters;

resolve conflicts, based at least on an external factor comprising pairing/ unpairing the mobile device with a car kit, between the plurality of predefined parameters corresponding with the respective zoom levels; and change the zoom-level of the mapping application to a mediated zoom-level.

* * * * *